Figure 1:
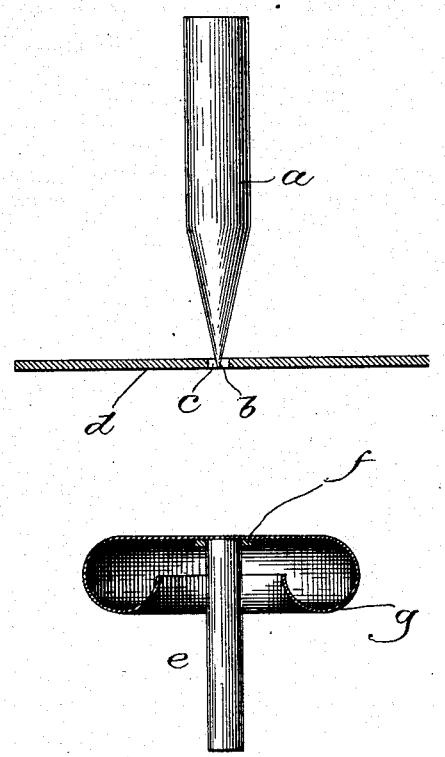

No. 676,583. Patented June 18, 1901.
T. B. KINRAIDE.
ELECTRICAL APPARATUS.
(Application filed Aug. 13, 1900.)

(No Model.) 2 Sheets—Sheet 1.

No. 676,583.  
T. B. KINRAIDE.  
ELECTRICAL APPARATUS.  
(Application filed Aug. 13, 1900.)  
Patented June 18, 1901.
(No Model.) 2 Sheets—Sheet 2.
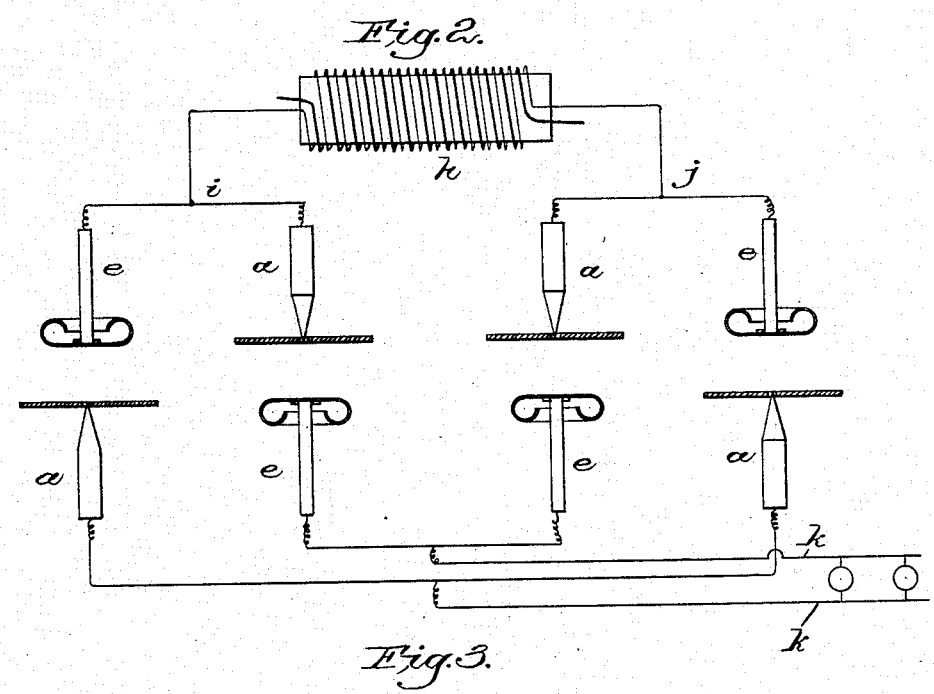
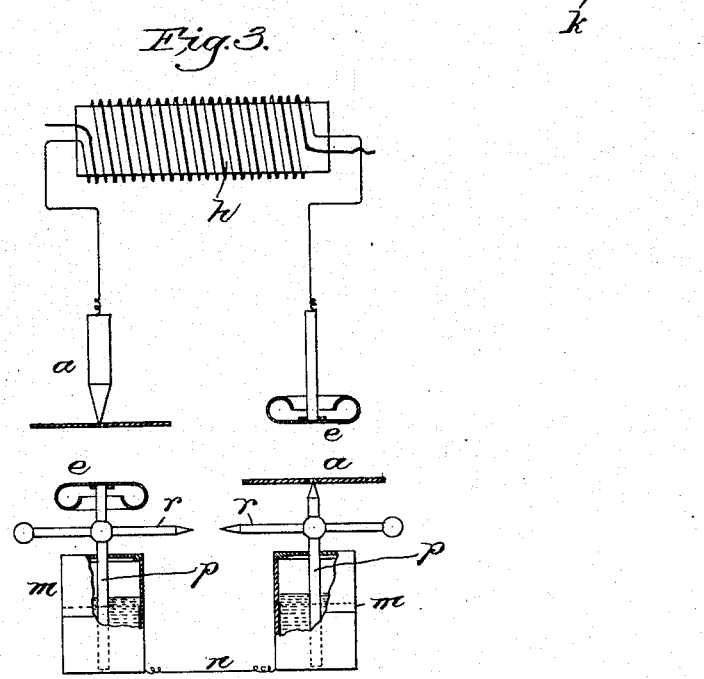

UNITED STATES PATENT OFFICE.

THOMAS B. KINRAIDE, OF BOSTON, MASSACHUSETTS.

ELECTRICAL APPARATUS.

SPECIFICATION forming part of Letters Patent No. 676,583, dated June 18, 1901.

Application filed August 13, 1900. Serial No. 26,709. (No model.)

*To all whom it may concern:*

Be it known that I, THOMAS BURTON KINRAIDE, a citizen of the United States, and a resident of Boston, county of Suffolk, and State of Massachusetts, have invented an Improvement in Electrical Apparatus, of which the following description, in connection with the accompanying drawings, is a specification, like letters on the drawings representing like parts.

My present invention is of wide application to various kinds of electrical apparatus and embodies certain important discoveries which I have made whereby I am enabled to positively maintain an electrical discharge in one direction only and under proper conditions to maintain said discharge continuously, producing, for instance, without the intervention of a commutator a continuous current directly from an alternating or intermittent current. Without necessarily stating that such is the fact, it may be supposed that there is simply electrical energy and that the presence of said energy is what we call a "positive" condition, and the absence of said energy is what we call a "negative" condition, and this, taken with my discovery that electric energy in its positive condition discharges reluctantly from a plane (without edges or angular or pointed surfaces) and discharges with perfect freedom from a point, enables me to control the direction of discharge of the current, and hence the accumulation of potential. The requisite conditions are provided by means of what I term an "extensionless point," which provides, as nearly as it can be done mechanically, the ideal discharge-electrode or positive condition for the outward flow of the electrical energy, and by means of what I term a "limitless plane," which provides in the same manner the receptive electrode or negative condition, in which there may be said to be an absence of energy (or a lower potential than that of the point from which the discharge comes) corresponding to a vacuous condition or absence of electrical pressure. By this means the electrical energy tends to discharge continuously in one direction only—viz., from the extensionless point to the limitless plane.

In the drawings, in which I have illustrated, largely diagrammatically, one form of my invention, Figure 1 represents, partly diagrammatically and largely in vertical cross-section, two electrodes arranged to provide the conditions above explained. Fig. 2 illustrates the application thereof for transforming an intermittent current into a constant current. Fig. 3 illustrates the application of my invention to Leyden jars for converting an intermittent discharge into a continuous discharge.

The general structural features of my invention may be very briefly stated.

Referring to Fig. 1, it will be seen that the electrode $a$ is pointed or pencil-shaped and that the extreme discharge-point $b$ is in or projected slightly through a small aperture $c$ in a rubber or other flat disk $d$, which extends at right angles thereto, the purpose of this disk being to cut off the attracting area which would otherwise be present in the converging walls or surfaces of the electrode $a$. By this means I provide an "extensionless point," speaking electrically. By this term I mean a point in which the attractive area of the electrode relatively to the opposite electrode is limited to the point itself, or, in other words, in which the rubber disk $d$ shields all the surface of the rod or electrode behind the very point thereof. The rubber disk constitutes means for cutting off the receptive area about the discharge-point. Opposite the electrode point $b$ is the receptive electrode $e$, which maintains a negative condition relatively to the electrode $a$ and which I have termed the "limitless plane," speaking again electrically, this electrode having a large receptive area and being provided with means for preventing the tendency to discharge, said means residing in presenting a receptive surface or plane without angles or points, and this plane is secured by providing a flat surface $f$ of considerable relative extent and curving its edges back and inwardly, as indicated at $g$, whereby, viewed electrically, the surface is limitless, inasmuch as it has no termination within the influence of the discharge-point $b$.

In operation, the positive energy discharges invariably from the point $b$ to the plane $f$, and there is no discharge from the latter back to the point, one reason therefor being that the attraction of the limitless plane is compelling, there being practically no attraction in the opposite direction due to the shielded point.

Applying the invention to practical uses, it will be seen that its field is important and large.

In Fig. 2 I have indicated a typical source of intermittent or alternating energy in the form of an induction-coil $h$, (operated by an alternating current,) whose terminals $i\ j$ are provided with electrodes $a\ e$ of the kind already described, and opposite these electrodes, which are arranged in pairs, are complementary electrodes $e\ a$, connected to a working circuit $k$, which it is desired shall have a continuous current.

Remembering that, as already explained, the extensionless-point and limitless-plane electrodes compel the discharge to take place in one direction, it will be seen that the intermittent or alternating discharge from the coil $h$ is automatically transferred into a continuous current by the lower sets of electrodes as arranged in Fig. 2.

Again referring for further illustration to Fig. 3, it will be seen that I have arranged two Leyden jars $m$, having their outer coatings electrically connected by a wire $n$ and their inner coatings connected by posts $p$, in which are mounted usual discharge-rods $r$, said posts, however, being provided on their upper extremities with the electrodes $a\ e$, opposite electrodes $e\ a$ at the terminals of a coil $h$, (operated by an interrupted current.) By this means it is possible to maintain constant discharge at an approximately fixed potential similar to the discharge from a static machine, as the intermittent discharge from the induction-coil, which is the source of supply for the Leyden jars, is enabled to keep the Leyden jars at a practically saturated point, so that the latter can maintain a constant discharge between their rods $r$. This application of my invention is of great practical importance for the electrical spinning of fine fibers, such as silk, the rapid evaporation of liquids, and the accomplishment of effects that can be produced by the continuous running of a static machine. The static machine necessarily leaks, is not subject to control, and is of necessity uncertain, whereas by my invention all these objections are removed and the static discharge is rendered continuous and uniform.

My invention is what might be called an "electrical check-valve," as it permits the unlimited discharge of the current in one direction, but checks it from discharging in the opposite direction.

In measuring the effectiveness of my invention I have found that upon arranging the source of supply in such a manner that a positive discharge could be compelled to pass from the electrode $e$ to the electrode $b$ the electrodes could only be one-quarter the distance apart that they could be when the current was passing in the opposite direction, and even then the current had to be forced or compelled to discharge, because, if possible, it would seek some other outlet in preference to the one desired for the sake of experiment.

It will be understood that the practical embodiment of my invention may be varied within a wide range of equivalent embodiments, and accordingly I do not limit myself otherwise than as is hereinafter expressed in the claims, nor do I limit myself in respect to the applications of my invention, as, for instance, it is useful as a spark-gap capable of definite control; also, for a lightning-arrester and a multitude of other uses.

Having described my invention, what I claim as new, and desire to secure by Letters Patent, is—

1. The herein-described means for producing a continuous or unidirectional discharge, consisting of electrodes one of which has a discharge-point and is provided with means for cutting off the receptive area about said point, and another of which has a large receptive area provided with means for preventing the tendency to discharge, as set forth.

2. An electrode terminating in a comparatively fine point, and a flat shield extending approximately at right angles to said electrode and having a small aperture in which said point is located.

3. An electrode terminating in a plane, conducting-surface, having its edges curved or rolled rearwardly and inwardly.

4. In an electrical apparatus, a source of intermittent electrical energy having at its opposite terminals electrodes one of which has a discharge-point provided with means for cutting off the receptive area about said discharge-point and the other of which has a large receptive area provided with means for preventing the tendency to discharge, said means residing in presenting a receptive surface without angles or points, and other electrodes coöperating with said terminal electrodes, there being a discharge-point electrode arranged to coöperate with a receptive-area electrode and vice versa.

5. In an electrical apparatus, a source of intermittent electrical energy of high potential, means for compelling a unidirectional discharge from one end thereof, means opposite said end for receiving said discharge, said means being incapable, under ordinary conditions, of transmitting a back discharge, and means coöperating therewith for storing and maintaining said charge at an approximately fixed potential and maintaining a constant discharge therefrom.

In testimony whereof I have signed my name to this specification in the presence of two subscribing witnesses.

THOMAS B. KINRAIDE.

Witnesses:
 GEO. H. MAXWELL,
 JOHN C. EDWARDS.